June 26, 1956

S. FÜRST 2,752,103

THREAD-FAULT RESPONSIVE CONTROL APPARATUS
FOR COIL WINDING MACHINES

Filed Feb. 4, 1953

INVENTOR.
Stefan Fürst
BY Knight Bros.
Attorneys

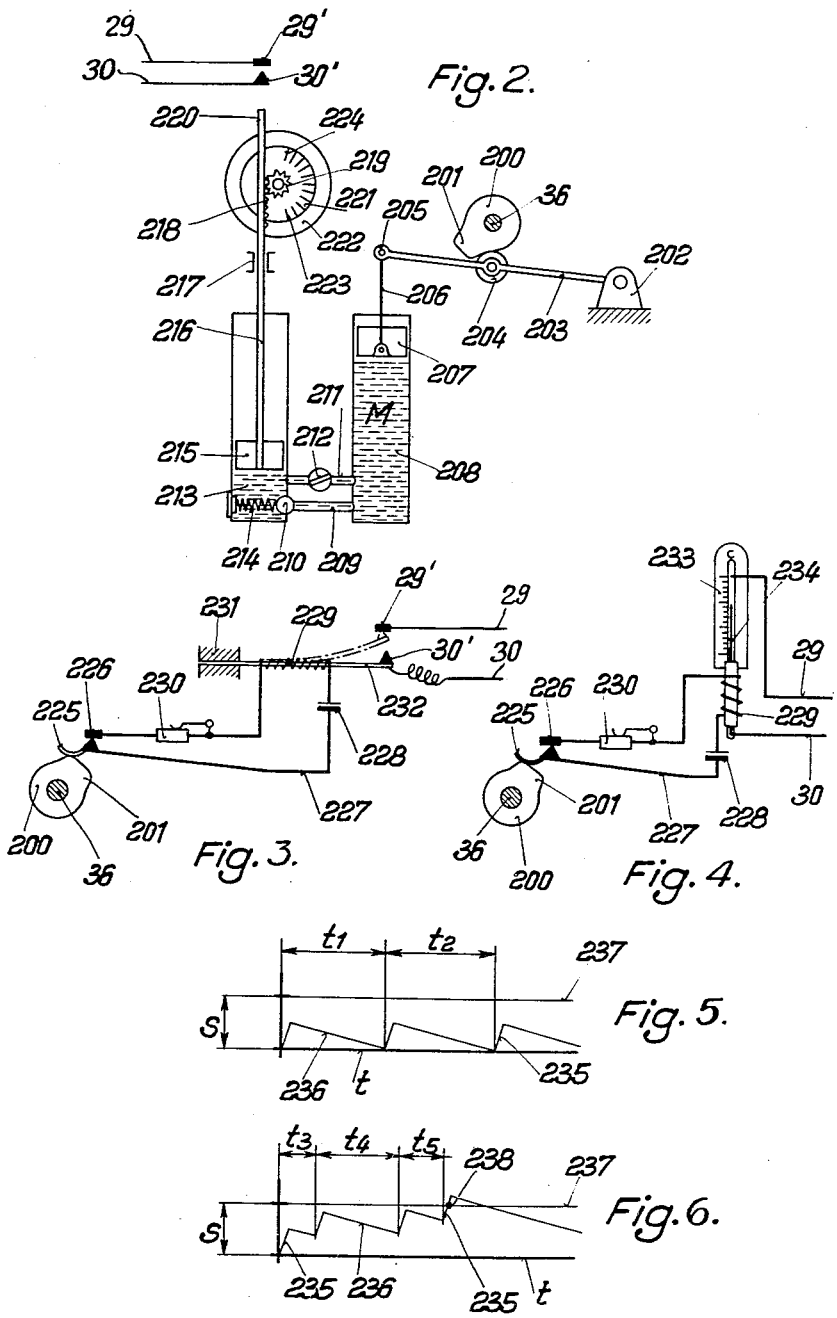

United States Patent Office 2,752,103
Patented June 26, 1956

2,752,103

THREAD-FAULT RESPONSIVE CONTROL APPARATUS FOR COIL WINDING MACHINES

Stefan Fürst, M. Gladbach, Rhineland, Germany, assignor to Walter Reiners, Waldniel, Lower Rhine, Germany Application February 4, 1953, Serial No. 335,000

Claims priority, application Germany February 4, 1952

12 Claims. (Cl. 242—36)

My invention concerns automatic-coil winding machines, particularly for the textile and related industries, and is related to the invention of the copending application Serial No. 227,553, filed May 22, 1951, of Walter Reiners and Stefan Fürst.

The copending application discloses an apparatus which, in response to breakage of the thread being wound or unwound, and also in response to failure of the then necessary thread tying operations, performs a controlling or signalling operation only when the occurrence of such faults exceeds a predetermined average. Thus, for instance, the apparatus may initiate an automatic replacement of the supply bobbin if the yarn quality of the particular bobbin is below a desired standard. The same control apparatus also indicates, by counting, measuring or recording devices, the number of the occurring faults in relation to the amount of yarn wound from the supply bobbin.

The present invention has for its general object to further improve such fault-responsive control apparatus for winding machines toward a simpler design, especially of the measuring and fault-number responsive devices, and also toward a still better approach of the automatic control performance to the optimum economy of manufacture. More specifically, it is an object of my invention to simplify the apparatus as regards the means needed for automatically resetting the fault counting or measuring devices to zero after replacement of a substandard or exhausted supply bobbin. Another specific object of the invention is to make the control apparatus capable of automatically discriminating between more or less local faults of the yarn that do not require bobbin replacement, and faults of a more frequent recurrence that signify a substandard bobbin to be replaced. An object, akin to the one just-mentioned, is to have the apparatus perform a control operation in response, not to a counted number of faults, but to a predetermined or selectively adjusted frequency of occurrence of the faults during any interval of time of given duration.

To achieve these objects, and in accordance with a feature of my invention, I provide the fault-responsive control device in apparatus generally of the above-mentioned type with an integrating system that receives a control pulse for each individual response of a fault-sensing means or thread feeler, and I give this integrating system a self-returning characteristic so that the integrated value decays back to zero during a predetermined, for instance adjustable, period of time. Such an integrating system is essentially a device for storing a physical quantity, such as pressure, heat quantity, electricity, volume, travel, or power, and has a relatively slow return flow or inherent equalization of the stored amount of that quantity.

I further connect the self-resetting integrating device with the fault-correction control means of the apparatus so that these control means respond only when the integrated total reaches a predetermined value. Consequently, the apparatus causes the particular winding unit of the winding machine to be stopped, or the supply bobbin to be exchanged, or some other fault-correcting or signalling operation to be performed only when the frequency of the faults per time unit is excessive; while no such control action takes place if the faults, regardless of their number, occur in spaced intervals or sporadically without raising the decay integrated amount up to the critical limit.

The foregoing and more specific objects, advantages and features of my invention, these features being set forth with particularity in the claims annexed hereto, will be apparent from the following description in conjunction with the drawings in which:

Fig. 2 shows schematically and more in detail a first embodiment of an integrating control device applicable in apparatus according to Fig. 1;

Fig. 3 and 4 show alternative embodiments of such an integrating device; and

Fig. 5 and 6 are coordinate graphs explanatory of the operation of devices according to Figs. 2, 3, and 4.

Figure 1:
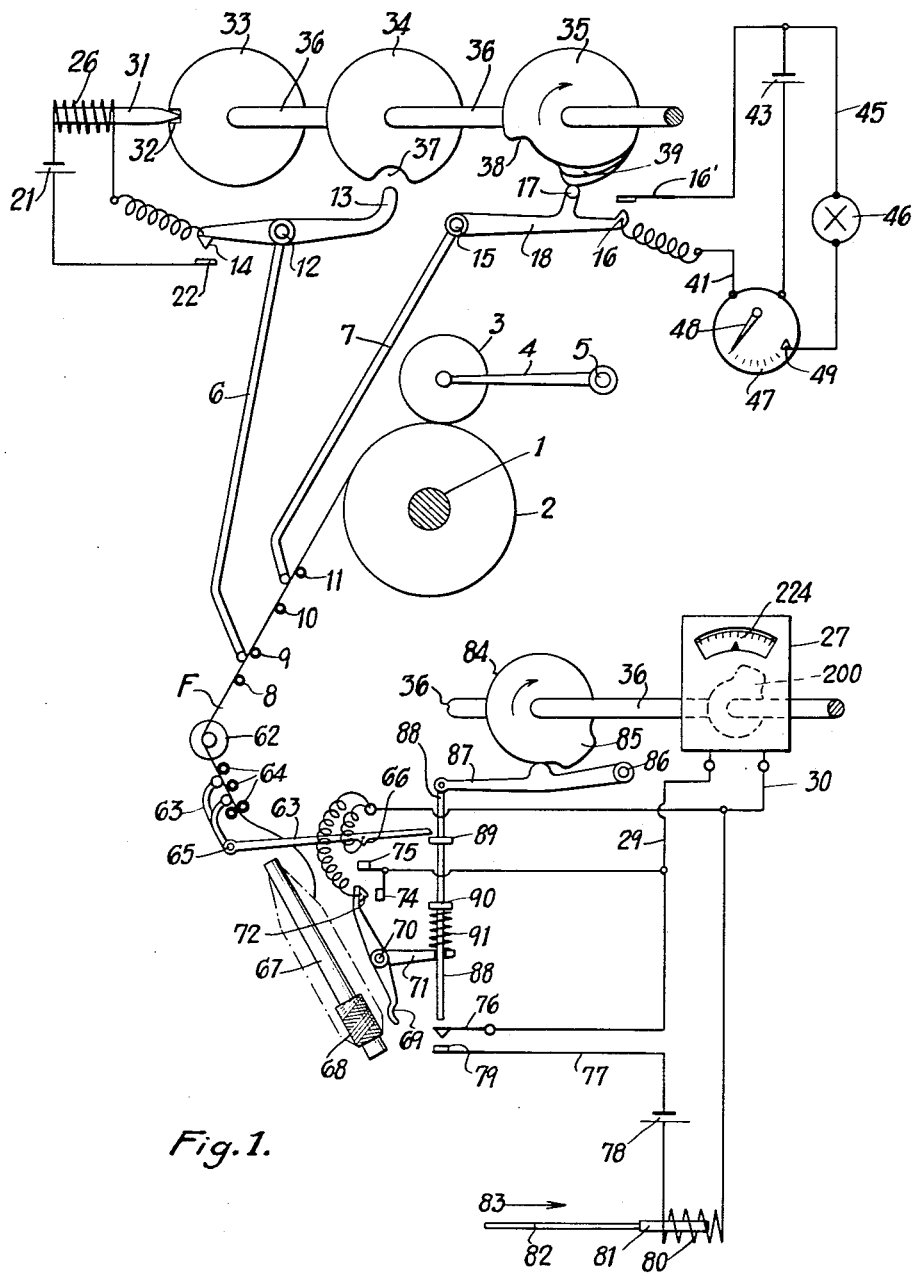
Fig. 1 illustrates schematically a coil-winding control apparatus according to the invention.

The illustration in Fig. 1 represents one of the coiling units of a winding machine. The thread F passes from a supply bobbin 67 through a tensioner 62 onto a guide drum 2 whose stationarily journalled shaft 1 revolves clockwise during the winding operation. The drum 2 entrains a takeup spool 3 on which the thread is wound up. Spool 3 is revolvably mounted on a winding frame 4 pivoted about a stationary shaft 5 so that the wound-up amount of thread material rests always against the periphery of drum 2 to secure a winding operation at a constant speed or at a fixed ratio to the revolving speed of the drum shaft 1.

Between the tensioner 62 and the guide drum 2 the thread F is normally engaged by two feelers 6 and 7. The tip of feeler 6 rests against a thread portion between two stationary abutment points 8, 9. The tip of feeler 7 rests against a thread portion between stationary abutment points 10 and 11. Feeler 6 is in operative condition during the winding operation and thus responds to the occurrence of thread breaks between tensioner 62 and guide drum 2. As will be explained below, the fault responsive movement of feeler 6 causes a start-stop mechanism to operate for automatically retying the torn thread. Feeler 7 is normally kept in inactive position and is permitted to operate only near the end of the just mentioned tying operation. If the tying operation was faulty, feeler 7 then responds to the absence of thread, while feeler 6 initiates a repetition of the tying operation. The response of feeler 7, as will be explained, serves to actuate a counting or integrating device 47 which performs an indicating or control action only when the total number of frequency of tying failures becomes excessive.

Another feeler 63 is provided between the bobbin 67 and the tensioner 62 to cooperate with thread-guiding abutment points 64. Feeler 63 responds to the absence of thread between bobbin and tensioner to initiate a bobbin replacing operation when the supply bobbin is exhausted. Another feeler 69 is brought into play temporarily during each tying operation initiated by the thread-break feeler 6. The feeler 69 then contacts the residual amount of thread 68 on bobbin 67 and causes an exchange of the bobbin if the residual amount 68 of thread has become too small for economically justifying a repeat of the tying operation.

The coaction of the above mentioned feelers with one another and with the other parts of the control apparatus will presently be described more in detail.

The feeler 6 is rotatable about a fixed pivot 12 and carries a lever 13 with an electric contact 14. Feeler 7 is rotatable about a fixed pivot 15 together with a lever 18 which has an electric contact 16 and carries a pin 17. The movable contact 14 is connected in the electric circuit of an electromagnet 26. The circuit is energized from a current source 21 and has a stationary contact 22 disposed opposite contact 14. Each time the feeler 6, in response to thread break, closes the circuit between contacts 14 and 22, the electromagnet 26 operates a latch 31 and withdraws it from a notch 32 in a control disc 33. The control disc 33 is mounted together with two control discs 34 and 35 on a drive shaft 36. Shaft 36 also carries a control cam 84 and a control cam 200, as well as any other control cams (not shown) that may be necessary for performing the desired operations. For lucidity of illustration, shaft 36 is shown in two fragments although this shaft may actually consist of a single element. Cam 36 is normally urged to revolve clockwise but is locked by a latch 31 so that a single revolution of shaft 36 and discs 33, 34, 35 occurs each time the latch is temporarily released by the operation of feeler 6.

Control disc 34 on shaft 36 has a cam recess 37 which moves away from lever 13 soon after shaft 36 starts revolving. The disc 34 then resets the feeler 6 and prevents it from dropping until after the tying run is completed. Control disc 35 has a cam recess 38 and a cam nose 39.

The contact 16 on lever 18 of feeler 7 coacts with a stationary contact 16' to close a circuit 41 which includes a current source 43 and the above-mentioned counting or integrating device 47. This device may consist of an electromagnetic stepping switch and has a pointer 48 which engages an adjustable limit contact 49 to energize the circuit of a signal or stop-motion relay 46 when the device 47 has responded to a predetermined number of operations of feeler 7. The device 47, instead of being a customary stepping switch, may also be designed in accordance with the integrating device 27 described in the following with reference to Figs. 2 to 6.

The above-mentioned feeler 63 ahead of the thread tensioner 62 is rotatable about a pivot 65 and carries a contact 66. The feeler 69 is rotatably mounted on a stationary pivot 70 and carries a lever 71 and a contact 72. Contact 72 is connected to a lead 30, to which the contact 66 is also connected. Another lead 29 is attached to stationary contacts 74, 75 and to a spring contact 76. A lead 77 connects a current source 78 with a stationary contact 79 engageable by the spring contact 76. A magnet 80 is connected between source 78 and lead 30. When energized, the magnet 80 moves a magnet core 81 with an operating rod 82 in the direction of the arrow 83. The rod 82 then effects the operation of the bobbin exchange devices (not shown) in a manner known as such and not essential to the invention proper.

The control disc 84 on shaft 36, turning clockwise when in operation, has a cam 85 engaged by a follower lever 87 stationarily pivoted at 86. Lever 87 is linked to a control rod 88 with stop rings 89 and 90. A helical compression spring 91 is inserted between stop ring 90 and the lever 71.

The cam 200 on shaft 36 forms part of an integrating device 27 shown schematically in Fig. 1. Device 27, under control by the individual revolutions of cam 200, indicates on a scale 224 the frequency of the thread-break responsive operations of feeler 6. Each individual response of feeler 6, resulting in a single-turn revolution of shaft 36 and cam 200, causes the indication on scale 224 to show a higher magnitude, but the indicated magnitude declines thereafter at a given rate so that it can reach a predetermined maximum only when the responses of feeler 6 are excessively frequent. When the maximum indication is reached, the device 27 closes the electric circuit between leads 29 and 30, thus causing the electromagnet 80 to initiate a bobbin exchange.

While details of the design and operation of the integrating device 27 remain to be described, it will be helpful to first review and complete the description of the apparatus as so far described.

The feeler 6 can operate only when shaft 36 and the pertaining control discs are in the illustrated position. When the thread breaks between tensioner 62 and the take-up coil, the feeler 6 releases the shaft 36 for one revolution to control the tying mechanism, and this also causes the cam 200 to issue an impulse in device 27. As soon as these operations are initiated by feeler 6, this feeler is locked by the control disc 34 until the tying cycle is completed. In contrast thereto, the feeler 7 is normally prevented from feeling the thread F since pin 17 bears against the cam periphery of control disc 35. During a control operation, however, the recess 38 of disc 35, passing along pin 17, temporarily releases the feeler 7. This occurs only near the end of the clockwise rotation of disc 35 and hence after the completion of all control operations necessary for thread tying and spool changing, but still during the continued run of control discs 35, 34, 33. Thus the feeler 7 is caused to temporarily feel the thread F to check whether the thread F is correctly knotted. If the tying operation was faulty, the feeler moves counterclockwise and closes the contacts 16, 16' thus completing the circuit of instrument 47. In the event of a repeated absence of thread, that is, when the tying failures occur too often, the signal or relay 46 is operated by the actuation of the adjustable contact 49 in instrucent 47. In addition, the number or frequency of control failures is at any time indicated by the instrument 47.

The feeler lever 63 is released for operation during the short interval of time in which the cam 85 of control disc 84 depresses the control lever 87 and the control rod 88 with the stop ring 89. During that interval, the contacts 76 and 79 are closed by the downward movement of rod 88, and the feeler 63, no longer stopped by ring 89, can move clockwise. As long as the thread F is present between points 64 and lever 63, the movement of feeler 63 is not sufficient to bring the feeler contact 66 into engagement with contact 75. However, if there is no thread between bobbin 67 and tensioner 62, contact 66 reaches contact 75 and closes the circuit of magnet 80 from current source 78 through lead 77, contact 79, contact 76, lead 29, contacts 75, 66, and lead 30. Magnet 80 now moves the operating rod 82 in the direction of the arrow 83, thus effecting an exchange of the bobbin at the beginning of the control operation.

Feeler 69 is resiliently held against bobbin 67 by the action of spring 91. At the beginning of the control operation, feeler 69 closes the contacts 72, 74 if at that time the thickness of the residual amount of thread 68 is below a predetermined magnitude. This also causes the magnet 80 to effect a bobbin exchange.

The integrating device 27 will now be described more in detail with reference to the embodiment shown in Fig. 2. The leads 29, 30 in Fig. 2 (also in Figs. 3, 4) are identical with respective leads 29, 30 in Fig. 1, and the cam 200 in Fig. 2 (or Figs. 3 and 4) is identical with cam 200 in Fig. 1. According to Fig. 2, cam 200 has a cam projection 201 coacting with a roller 204 journalled on a lever 203 which is pivoted on a stationary bearing 202. Lever 203 is linked by a rod 206 with a piston 207 movable within a cylindrical portion 208 of a hydraulic device. Cylinder 208 communicates with another cylindrical portion 213 through a conduit 209 equipped with a check valve 210. Another communication between the cylinders 208 and 213 is formed by a bypass conduit 211 with an adjustable throttle valve 212. The check valve 210 has a valve ball biased by a spring 214. Movable in cylinder 213 is a piston 215. The pertaining piston rod 216 is guided in a stationary slide bearing 217 and carries a rack 218 meshing with a stationarily journalled pinion 219. The upper end 220 of piston rod 216 is engageable with a movable contact 30' electrically engageable with a stationary contact 29'. Contacts 29' and 30' are connected with the respective leads 29 and 30. Pinion 219 is connected with an indicator disc 221 which carries the above-mentioned scale 224. Disc 221 is revolvable in front of a stationary disc 222 equipped with a reference mark 223. The liquid or gaseous medium within cylinders 208 and 213 is designated by M.

In the modified embodiment of Fig. 3, the nose 201 of cam 200 on shaft 36 cooperates with an electric contact 225 which, in the illustrated position, is in engagement with a stationary contact 226. Contacts 225 and 227 are connected in an electric circuit 227 which includes a current source 228, a heater 229 and a control resistor 230. The heater 229 is wound about a bimetal strip 252 mounted on a stationary part 231. The free end of strip 232 carries an electric contact 30' connected to lead 30 for coaction with a stationary contact 29' attached to lead 29.

The embodiment of Fig. 4 is largely similar to that of Fig. 3. However, the heating winding 229 in circuit 227 is placed around a contact thermometer 233 whose conductive column 234 of heat-expansible liquid is electrically connected with lead 30. When the column 234 is sufficiently heated it reaches a contact connected to lead 29 thus closing the circuit between leads 29 and 30.

In the coordinate diagrams of Figs. 5 and 6, the abscissa denotes time ($t$), and the ordinate indicates distance of travel. The travel distance required up to the moment when the circuit between leads 29 and 30 is closed is represented by the value $s$. The intervals of time from one pulse to the other are denoted by $t1$, $t2$, $t3$, $t4$, and $t5$. The curve portions 235 denote the increasing physical quantities such as pressures, volumes, heat quantities or the like supplied into the integrating device whenever the fault responsive feeler (6) causes the tying mechanism to operate. The slopes 236 represent the slow return flow or decay of the just-mentioned physical quantity occurring between the individual tying operations. The lines 235 and 237 intersect in point 238 (Fig. 6).

The operation of the device according to Fig. 2 is as follows.

During a revolution of the drive shaft 36 and the control cam 200 mounted thereon, the cam nose 201 forces the roller 204 downward. As a result and due to the articulate connection of lever 203 with rod 206, the piston 207 is pressed downward. This causes the medium M in cylinder 208 to be pumped through the two conduits 209 and 211 into the cylinder 213 thus moving the piston 215 with rod 216 upwardly. After each individual revolution of cam 200, the cam remains at rest, provided the thread is properly tied so that the thread again occupies its correct path. During each period of rest, the medium M, subjected to the weight of piston 215 and the parts mounted thereon, is gradually forced back into the cylinder 208 through the bypass conduit 211 and the adjustable regulating valve 212, a return flow through the conduit 209 being prevented by check valve 210. If the interval between the individual operations of cam 200 is so large that piston 215 and piston rod 216 may completely or almost completely return to the lowermost position before another operation of shaft 36 and hence another tansfer medium M from cylinder 208 into cylinder 213 occurs, the contacts 29' and 30' may never be actuated by the end 220 of piston rod 216.

This operating condition is represented in Fig. 5 showing that the quantity of liquid pumped into the cylinder 213 can gradually escape back into the cylinder 208 during the time interval $t1$ between one and the next following tying operation.

According to Fig. 6, however, the time spacing ($t3$, $t4$, $t5$) between successive tying operations is so short that the integrated total travel distance of piston rod 216 increases incrementally. Consequently, the intervening decay or return flow according to curve slopes 236 does not suffice to bring the piston rod back to the original, lowermost position. This has the result that the individual pulses 235 are integrated up to a value at which the end 220 of piston rod 216 abuts against contact 30' and closes the circuit between leads 29 and 30. The intersection 238 of lines 235 and 237 in Fig. 6 indicates the moment at which contacts 29' and 30' are closed.

The instantaneous positions of the piston 215 are transferred by rack 218 and pinion 219 to the indicator disc 221 so that this position is indicated by mark 223 on scale 224. This indication is also a measure of the average intervals occurring between consecutive thread breaks and hence may serve as an indication of the quality of the yarn.

In the integrating device according to Figs. 3 and 4, the closing of contacts 225 and 226 has the effect of temporarily energizing the heating winding 229 from the current source 228 thus increasing the temperature of the bimetal strip 232 (Fig. 3) or of the conductive liquid column 234 (Fig. 4). The instantaneous position of the bimetal strip 232 or of the column 234 is a measure of the yarn quality, i. e. of the intervals between one and the next thread break. When the return flow or dissipation of the heat produced by the heating winding 229 is insufficient to permit a continual reset movement, the temperature-responsive movement eventually reaches a magnitude at which the contact between leads 29 and 30 is closed, thereby initiating the exchange of the supply coil and/or a stoppage of the winding unit in the manner explained previously.

It will be obvious to those skilled in the art upon a study of this disclosure that control apparatus according to my invention permit of various modifications and may be embodied in designs other than those specifically described, without departing from the essence of the invention and within the scope of the claims annexed hereto.

I claim:

1. Fault-responsive control apparatus for coil winding machines, comprising sensing means responsive to thread fault, a measuring device connected with said sensing means, said sensing means being operative to cyclicly apply a discrete amount of energy to said measuring device when sensing a thread fault, said measuring device including time integration means for temporarily storing said discrete amounts of energy, said time integration means being operative gradually to release said stored energy and fault-correction control means connected with said device and operative only when the stored energy in said time integration means reaches a value greater than that caused by a single application of said discrete amount of energy, whereby said control means respond to said sensing means only when a given plurality of thread fault sensings occur within a given period of time.

2. Fault-responsive control apparatus for coil winding machines, comprising sensing means responsive to thread fault, a storing device for accumulating energy, adjustable supply means connected with said device for supplying said energy and connected to said sensing means to be cyclicly controlled by said sensing means, whereby said storing device receives an adjusted amount of said energy for each operation of said sensing means, said storing device having a given energy loss characteristic effective to accumulate a given total magnitude of said amounts only when said operations occur at a given minimum frequency, and fault-correction control means connected with said device and responsive to said given total magnitude.

3. Fault-responsive control apparatus for coil winding machines, comprising sensing means responsive to thread fault, a single-stroke pulse generating device connected with said sensing means to be controlled thereby, an integrating device connected with said pulse generating device for successively time integrating successive discrete magnitudes of energy released by consecutive pulses from said generating device, said integrating device having a given decay period of said integrated magnitude, and fault-correction control means connected with said device and responsive to said integrated magnitude reaching a predetermined value, whereby said control means respond to said sensing means.

4. Fault-responsive control apparatus in machines for winding thread from a supply coil comprising thread guiding means defining a thread path between the supply coil and a take-up point, thread-fault responsive sensing means disposed along said path, a single-stroke pulse generating device connected with said sensing means to be controlled thereby, an integrating device connected with said pulse generating device for incrementally integrating a physical magnitude under control by consecutive pulses from said generating device, said integrating device having a given decay period of said integrated magnitude, and supply-coil exchange control means connected with said device and responsive to a predetermined value of said integrated magnitude.

5. Fault-responsive control apparatus for coil winding machines, comprising thread guiding means defining a thread path from a supply point to a take-up point, feeler means engageable with the thread along said path and movable in response to thread fault, a start-stop mechanism connected with said feeler means to be released for individual start-stop motion by each fault response of said feeler means and having a pulse member engageable by said cam to issue a pulse during each start-stop motion of said mechanism, an integrating device connected with said pulse member for incrementally integrating a physical magnitude under control by consecutive operations of said member, said device having a given decay period of said integrated magnitude, and fault-correction control means connected with said device and responsive to a given value of said integrated magnitude, whereby said control means respond to said feeler means only when a given number of thread faults occur within a given period of time.

6. Fault-responsive control apparatus in machines for winding thread from a supply coil comprising thread guiding means defining a thread path between the supply coil and a take-up point, feeler means engageable with the thread along said path and movable in response to thread fault, a start-stop mechanism connected with said feeler means to be released for individual start-stop motion by each fault response of said feeler means, said mechanism having cam means and having a pulse member engageable by said cam to issue a pulse during each start-stop motion of said mechanism, an integrating device connected with said pulse member for incrementally integrating a physical magnitude under control by consecutive operations of said member, said device having a given decay period of said integrated magnitude, and supply-coil exchange control means connected with said device and responsive to a predetermined value of said integrated magnitude.

7. Fault-responsive control apparatus for coil winding machines, comprising sensing means responsive to thread fault, an integrating device connected with said sensing means and having a member progressively movable in response to consecutive operations of said sensing means to thereby integrate a total distance of movement, said member having a return bias so as to reach a given value of said total distance only when thread faults occur at a given minimum frequency, and fault-correction control means connected with said member and responsive to occurrence of said given distance value.

8. In apparatus according to claim 3, said pulse generating device comprising adjusting means for varying the amount of said discrete magnitude of energy released per pulse.

9. Fault-responsive control apparatus for coil winding machines, comprising sensing means responsive to thread fault, an integrating device connected with said sensing means and having a member progressively movable in response to consecutive operations of said sensing means to thereby integrate a total distance of movement, said member having a return bias so as to reach a given value of said total distance only when thread faults occur at a given minimum frequency, an electric switch having a movable contact engageable and operable by said member when said total distance reaches said value, and fault-correction control means connected with said switch to be controlled by operation of said contact.

10. Fault-responsive control apparatus for coil winding machines, comprising sensing means responsive to thread fault, an electric pulse contact device connected with said sensing means for issuing a current pulse for each operation of said sensing means, a thermo-responsive device having an electric heating circuit and being adapted to produce mechanical movement when heated, said circuit being connected with said contact device, and fault-correction control means connected with said thermo-responsive device and responsive to said movement reaching a given total value, whereby said control means are operated in response to thread faults only when the frequency of said faults exceeds a limit depending upon the cooling conditions of said thermo-responsive device.

11. Fault-responsive control apparatus for coil winding machines, comprising sensing means responsive to thread fault, an electric pulse contact device connected with said sensing means for issuing a current pulse for each operation of said sensing means, a thermo-deflective structure having an electric heating circuit to perform deflective movement when heated, said heating circuit being connected with said contact device, and fault-correction control means having a part engageable with said structure and responsive to a given total value of said movement, whereby said control means are operated in response to thread faults only when the frequency of said faults exceeds a limit depending upon the thermal conditions of said structure.

12. In apparatus according to claim 5, said integrating device comprising a hydraulic system having a pump portion and a variable-volume receiver portion communicating with each other, said pump portion having a piston which forms said pulse member so as to supply volume-expanding pressure to said receiver portion due to operation of said cam means, whereby said receiver portion forms said integrating member, and an adjustable throttle duct interconnecting said two portions for adjusting said decay period.

References Cited in the file of this patent

UNITED STATES PATENTS

| | | |
|---|---|---|
| 1,442,312 | Watson | Jan. 16, 1923 |
| 1,558,101 | Lieb | Oct. 20, 1925 |
| 2,139,474 | Shepard | Dec. 6, 1938 |
| 2,262,032 | Moore | Nov. 11, 1941 |
| 2,304,645 | Keeler | Dec. 8, 1942 |
| 2,566,187 | Giuffrida | Aug. 28, 1951 |
| 2,652,125 | Dewhirst | Sept. 15, 1953 |